(12) United States Patent
Grawrock (10) Patent No.: US 7,103,771 B2
(45) Date of Patent: Sep. 5, 2006

(54) CONNECTING A VIRTUAL TOKEN TO A PHYSICAL TOKEN

(75) Inventor: David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 623 days.

(21) Appl. No.: 10/028,894

(22) Filed: Dec. 17, 2001

(65) Prior Publication Data

US 2003/0115453 A1    Jun. 19, 2003

(51) Int. Cl.
G06F 17/00 (2006.01)
(52) U.S. Cl. .................... 713/155; 713/159; 726/9
(58) Field of Classification Search ........ 713/150–161, 713/163–181, 200–202; 726/9, 20
See application file for complete search history.

(56) References Cited

U.S. PATENT DOCUMENTS

| | | | |
|---|---|---|---|
| 3,699,532 A | 10/1972 | Schaffer, et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |

(Continued)

FOREIGN PATENT DOCUMENTS

EP    0600112    8/1994

(Continued)

OTHER PUBLICATIONS http://www.rsasecurity.com/products/securid/datasheets/SID_DS_0103.pdf.*

(Continued)

*Primary Examiner*—David Jung
(74) *Attorney, Agent, or Firm*—Jeffrey P. Ward (57) ABSTRACT

Credentials may by issued to virtual tokens of a computing device based upon a credential issued to physical token of the computing device thus tying the virtual token credential to the physical token credential.

30 Claims, 4 Drawing Sheets

U.S. PATENT DOCUMENTS

| | | |
|---|---|---|
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,956,408 A | 9/1999 | Arnold |
| 5,970,147 A | 10/1999 | Davis |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo et al. |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery |
| 6,314,409 B1 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B1 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |

| | | | |
|---|---|---|---|
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 2001/0021969 A1 | 9/2001 | Burger, et al. | |
| 2001/0027511 A1 | 10/2001 | Wakabayashi, et al. | |
| 2001/0027527 A1 | 10/2001 | Khidekel, et al. | |
| 2001/0037450 A1 | 11/2001 | Metlitski, et al. | |
| 2002/0007456 A1 | 1/2002 | Peinado, et al. | |
| 2002/0023032 A1 | 2/2002 | Pearson, et al. | |
| 2003/0018892 A1 | 1/2003 | Tello | |

FOREIGN PATENT DOCUMENTS

| | | |
|---|---|---|
| EP | 0892521 | 1/1999 |
| EP | 0930567 A | 7/1999 |
| EP | 0961193 | 12/1999 |
| EP | 0965902 | 12/1999 |
| EP | 1055989 | 11/2000 |
| EP | 1056014 | 11/2000 |
| EP | 1085396 | 3/2001 |
| EP | 1146715 | 10/2001 |
| EP | 1271277 | 1/2003 |
| WO | WO9524696 | 9/1995 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO9957863 | 11/1999 |
| WO | WO99/65579 | 12/1999 |
| WO | WO0021238 | 4/2000 |
| WO | WO0062232 | 10/2000 |
| WO | WO0163994 | 8/2001 |
| WO | WO0201794 | 1/2002 |
| WO | WO02060121 | 8/2002 |
| WO | WO03058412 | 7/2003 |

OTHER PUBLICATIONS http://www.rsasecurity.com/node.asp?id=1313.*
http://www.rsasecurity.com/node.asp?id=1158.*
www.hp.be/egov/doc/mobile/mobile_overview.pdf.*
A virtual token dual bus protocol for the interconnection network in CDMA mobile communication system; Jeong et al.; Computers and Communications, 1998. ISCC '98. Proceedings. Third IEEE Symposium on pp. 370-374.*
A multicast protocol based on a single logical ring using a virtual token and logical clocks; Jia et al.; Parallel Processing, 1996., Proceedings of the 1996 International Conference on vol. 1, Aug. 12-16, 1996 Pages(s) 85-92.*

Buzz-Net: A Hybrid Token/Random Access LAN; Gerla, M.; Guang-Shing Wang; Rodrigues, P.; Selected Areas in Communications, IEEE Journal on vol. 5, Issue 6, Jul. 1987 Page(s):977-988.*

Coulouris, George, et al., "Distributed Systems, Concepts and Designs", 2nd Edition, (1994),422-424.

Crawford, John, "Architecture of the Intel 80386", *Proceedings of the IEEE International Conference on Computer Design: VLSI in Computers and Processors (ICCD '86 )*, (Oct. 6, 1986), 155-160.

Fabry, R.S., "Capability-Based Addressing", Fabry, R.S., "*Capability-Based Addressing,*" Communications of the ACM, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE* , (1982),9-16.

Intel Corporation, "IA-64 System Abstraction Layer Specification", *Intel Product Specification* , Order Number 245359-001, (Jan. 2000),1-112.

Intel Corportation, "Intel 82802AB/82802AC Firmware Hub (FWH)", *Intel Product Datasheet*, Document No. 290658-004,(Nov. 2000), 1-6, 17-28.

Intel Corporation, "Intel IA-64 Architecture Software Developer's Manual", *vol. 2: IA-64 System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985),171-178.

Schneier, Bruce, "Applied Cryptography: Protocols, Algorithm, and Source Code in C", Wiley, John & Sons, Inc., XP002939871: ISBN 0471117099,(Oct. 1995),47-52.

Schneier, Bruce, "Applied Cryptography: Protocols, Algorithm, and Source Code in C", Wiley, John & Sons, Inc., XP002138607; ISBN 0471117099,(Oct. 1995),56-65.

Schneier, Bruce, "Applied Cryptography: Protocols, Algorithms, and Source Code C", Wiley, John & Sons, Inc., XP0021111449; ISBN 0471117099,(Oct. 1995),169-187.

Schneier, Bruce, "Applied Cryptography: Protocols, Algorithms, and Source Code in C", 2nd Edition; Wiley, John & Sons, Inc., XP002251738; ISBN 0471128457,(Nov. 1995),28-33; 176-177; 216-217; 461-473; 518-522.

* cited by examiner

CONNECTING A VIRTUAL TOKEN TO A PHYSICAL TOKEN

BACKGROUND

Existing software-based security services make the implicit assumption that a computing device or platform is trusted. They provide application-level security on the assumption that they execute in a safe environment. This assumption is true enough to justify the level of security required for existing business models, but state-of the-art security functions are already providing the highest levels of protection that are possible without additional hardware support.

To this end, the Trusted Platform Computing Alliance (TPCA) describes in the TCPA Main Specification, Version 1.1, Jul. 31, 2001 a Trusted Platform Module (TPM) or physical token that provides increased confidence and that enables enhancements of existing services and new services. The TPM supports auditing and logging of software processes, platform boot integrity, file integrity, and software licensing. The TPM provides a protected information store for the platform that can be used to attest to the identity of the platform as defined by the hardware that is present (e.g. processors, chipsets, firmware, etc.). These features encourage third parties to grant the platform access to information that would otherwise be denied.

The TPM contains an isolated computing engine whose processes can be trusted because they cannot be altered. These processes and the binding of the subsystem to the platform can combine to reliably measure and report the state of the main computing environment inside the platform. The TPM provides a root of trust for the booting of the platform. While it is the Owner's responsibility to provide a safe operating system for a platform, once the OS has loaded, it can report the loading of untrusted software to the TPM before that untrusted software is loaded. The TPM can therefore report measured data that indicates the current state of the main software environment in the platform. A local or remote entity can simply query the TPM to reliably obtain these measurements and decide whether the platform's behavior enables it to be trusted for the intended purpose. Confidence in the loading of software is improved, because the TPM can attest to the current state of the operating system.

The TPM may act as a portal to confidential data, and may allow the release or use of that data only in the presence of a particular combination of access rights and software environment. Of course, the protected store of the TPM may be used for any sensitive data, not just identity information. The TPM may export these services to system-level software security services (such as IPSec) that are themselves called as services by ordinary applications. This arrangement enables greater confidence in the identity of a platform, while simultaneously allowing platform anonymity if so desired. Hence, any application that invokes proof of identity can be used with greater confidence and be allowed greater power.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are described in order to provide a thorough understanding of the invention. However, the present invention may be practiced without these specific details. In other instances, well-known methods, procedures, components and circuits have not been described in detail so as not to obscure the present invention. Further, example sizes/models/values/ranges may be given, although the present invention is not limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
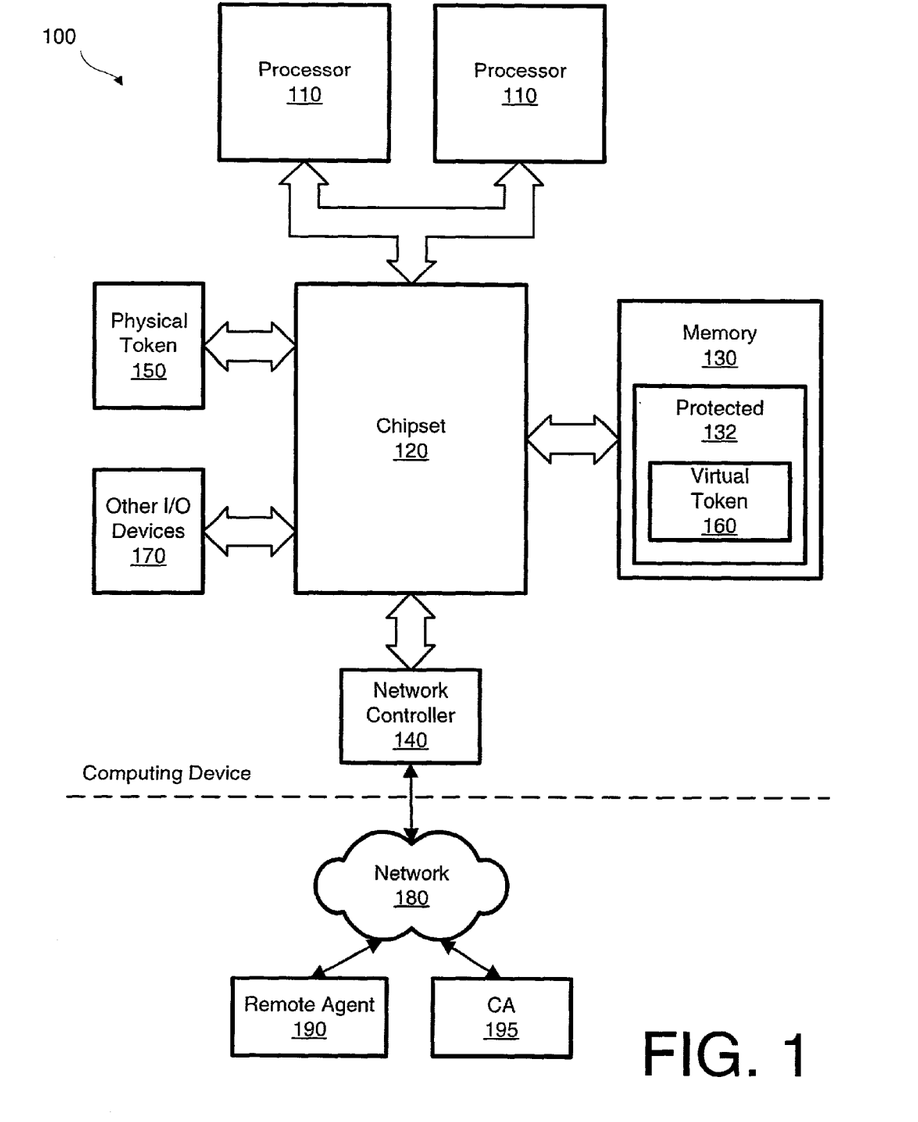
FIG. 1 illustrates an example computing device comprising a physical token and a virtual token.

An example computing device 100 shown in FIG. 1 may comprise one or more processors 110. The processors 110 may support one or more operating modes such as, for example, a real mode, a protected mode, a virtual 8086 mode, and a virtual machine mode (VMX mode). Further, the processors 110 may support one or more privilege levels or rings in each of the supported operating modes. In general, the operating modes and privilege levels of a processor 110 define the instructions available for execution and the effect of executing such instructions. More specifically, a processor 110 may be permitted to execute certain privileged instructions only if the processor 110 is in an appropriate mode and/or privilege level.

The chipset 120 may comprise one or more integrated circuit packages or chips that couple the processors 110 to memory 130, a network interface 140, a physical token 150, a virtual token 160, and other I/O devices 170 of the computing device 100 such as, for example, a mouse, keyboard, disk drive, video controller, etc. The chipset 120 may comprise a memory controller (not shown) for writing and reading data to and from the memory 130. Further, the chipset 120 and/or processors 110 may define certain regions of the memory 130 as protected memory 132 that may be accessed only by the processors 110 when in a particular operating mode (e.g. protected mode) and privilege level (e.g. 0P).

The network interface 140 generally provides a communication mechanism for the computing device 100 to communicate with remote agents 190 and certification authorities 195 via a network 180. For example, the network interface 140 may comprise a 10 Mb or 100 Mb Ethernet controller, a cable modem, a digital subscriber line (DSL) modem, plain old telephone service (POTS) modem, etc. to couple the computing device 100 to one or more remote agents 190 and/or certificate authorities 195.

In general, the physical token 150 of the computing device 100 comprises protected storage for integrity metrics, keys and secrets and may perform various integrity functions in response to requests from the processors 110 and the chipset 120. In particular, the physical token 160 may store integrity metrics in a trusted manner, may quote integrity metrics in a trusted manner, may seal secrets to a particular environment (current or future), and may unseal secrets to the environment to which they were sealed. Further, as will be explained later, the physical token 150 may include an identifier or key that uniquely identifies the computing device 100.

The virtual token 160 performs in a manner similar to the physical token 150 of the computing device 100. However, the virtual token 160 may comprise more protected storage for integrity metrics, keys and secrets since the virtual token 160 may leverage the storage capacity of the memory 130 and the protect memory 132 to store integrity metrics, keys and secrets. Further, the virtual token 160 may perform integrity operations quicker than the physical token 150 since the virtual token 160 may leverage the processing capabilities of the processors 110 to perform such integrity operations.

Figure 2:
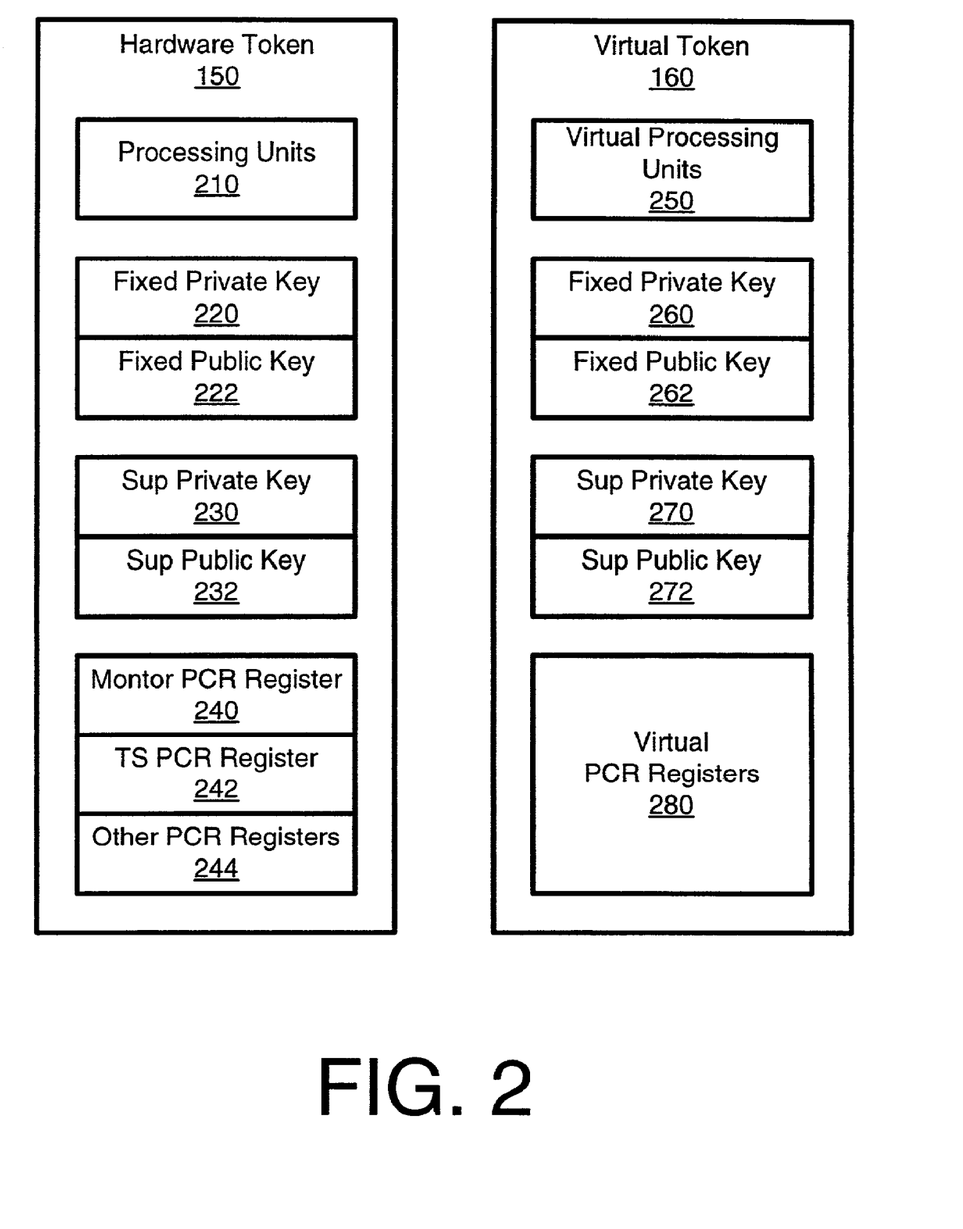
FIG. 2 illustrates an example physical token and an example virtual token of FIG. 1.

As illustrated in FIG. 2, the physical token 150 may comprise one or more processing units 210 that may perform integrity functions for the computing device 100. The physical token 150 may further generate a fixed private key 220 and a corresponding fixed public key 222 in accordance with an asymmetric cryptographic algorithm such as, for example, the RSA cryptographic algorithm. In an example embodiment, the physical token 150 generates the fixed private/public key pair 220, 222 such that the fixed private key 220 and corresponding public key 222 are unique and immutable once activated.

The physical token 150 may also be affixed to or incorporated into the computing device 100 to provide some assurance to remote agents 190 that the physical token 150 is associated with only one computing device 100. For example, the physical token 150 may be incorporated into one of the chips of the chipset 120 and/or surface mounted to the main board of the computing device 100. Due to the uniqueness of the fixed physical token 150 and its incorporation into the computing device 100, a remote agent 190 may identify a computing device 100 with some certainty based upon the fixed public key 222 of the physical token 150.

Besides the fixed private/public key pair 220, 222, the physical token 150 may further generate one or more supplemental private/public key pairs 230, 232 in accordance with an asymmetric cryptographic algorithm. In an example embodiment, the computing device 100 may generate supplemental private/public key pairs 230, 232 as needed whereas the fixed private/public key pair 220, 222 is immutable. Accordingly, the computing device 100 typically provides the fixed public key 222 to only a small trusted group of entities such as, for example, remote agents 190 and certification authorities 195. Further, the computing device 100 typically utilizes its supplemental private/public key pairs 230, 232 for most other encryption, decryption, and digital signing operations to reduce exposure of the fixed public key 222.

The physical token 150 may further comprise one or more platform configuration registers (PCR registers) 240, 242, 244 that may be used to record and report integrity metrics in a trusted manner. The processing units 210 may support a PCR quote operation that returns a quote or contents of an identified PCR register 240, 242, 244. The processing units 210 may also support a PCR extend operation that records a received integrity metric in an identified PCR register 240, 242, 244. In particular, the PCR extend operation may (i) concatenate or append the received integrity metric to an integrity metric stored in the identified PCR register 240, 242, 244 to obtain an appended integrity metric, (ii) hash the appended integrity metric to obtain an updated integrity metric that is representative of the received integrity metric and previously integrity metrics recorded by the identified PCR register 240, 242, 244, and (iii) store the updated integrity metric in the PCR register 240, 242, 244.

As used herein, the verb "hash" and related forms refer to performing an operation upon an operand or message to produce a value or a "hash". Ideally, the hash operation generates a hash from which it is computationally infeasible to find a message with that hash and from which one cannot determine any usable information about a message with that hash. Further, the hash operation ideally generates the hash such that determining two messages which produce the same hash is computationally impossible. While the hash operation ideally has the above properties, in practice one way functions such as, for example, the Message Digest 5 function (MD5) and the Secure Hashing Algorithm 1 (SHA-1) generate hash values from which deducing the message are difficult, computationally intensive, and/or practically infeasible.

The physical token 150 may be implemented in a number of different manners. However, in an example embodiment, the physical token 150 is implemented to comply with the specification of the Trusted Platform Module (TPM) described in detail in the Trusted Computing Platform Alliance (TCPA) Main Specification, Version 1.1, 31 Jul. 2001.

Still referring to FIG. 2, the virtual token 160 may provide virtual or software constructs that provide functionality similar to the physical token 150. In particular, the virtual token 160 may comprise one or more virtual processing units 250 that may perform integrity functions for the computing device 100. The virtual token 160 may further generate a fixed private key 260 and a corresponding fixed public key 262 in accordance with an asymmetric cryptographic algorithm such that the fixed private key 260 and corresponding public key 262 are unique and immutable once activated.

Besides the fixed private/public key pair 260, 262, the virtual token 160 may also generate one or more supplemental private/public key pairs 270, 272 in accordance with an asymmetric cryptographic algorithm. The virtual token 160 may further comprise one or more virtual PCR registers 280 that may be used to record and report integrity metrics in a trusted manner.

Figure 3:
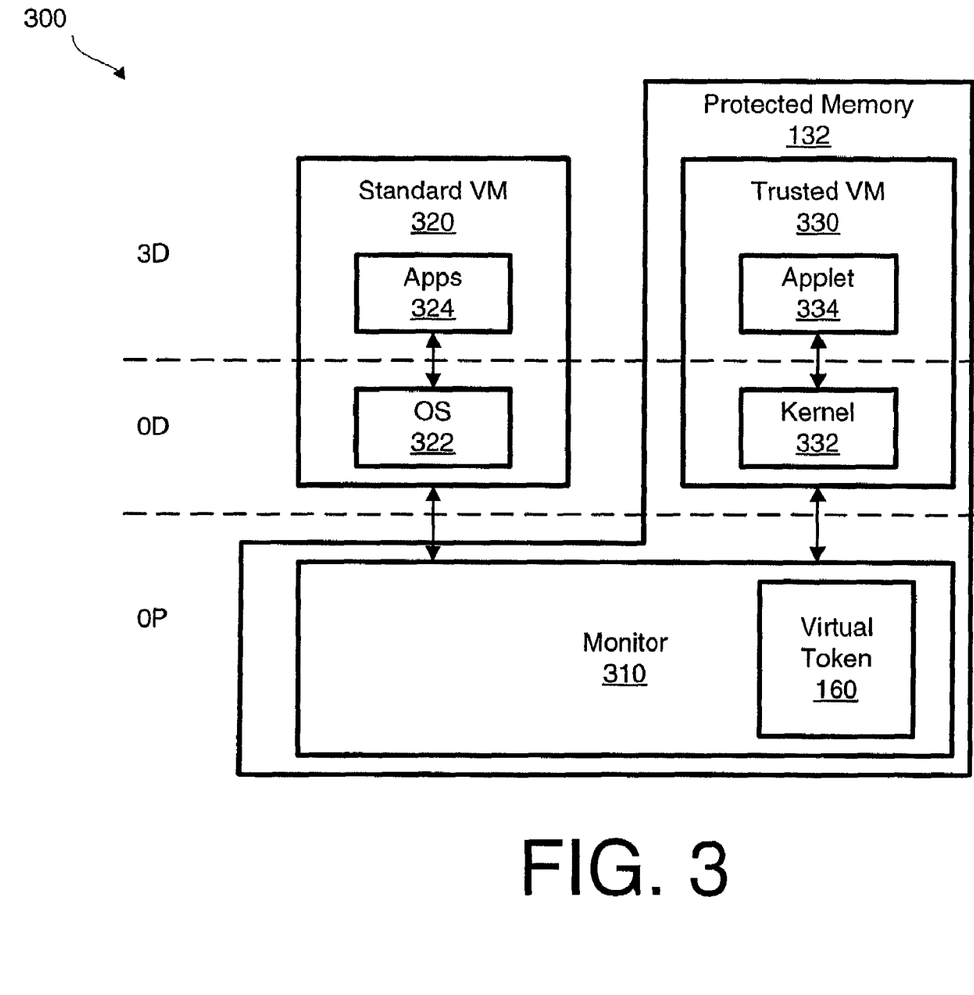
FIG. 3 illustrates an example trusted operating environment that may be implemented by the computing device of FIG. 1.

An example trusted operating environment 300 is shown in FIG. 3. The computing device 100 may utilize the operating modes and the privilege levels of the processors 110 to establish the trusted operating environment 300. As shown, the trusted operating environment 300 may comprise a trusted virtual machine kernel or monitor 310, one or more standard virtual machines (standard VMs) 320, and one or more trusted virtual machines (trusted VMs) 330. The monitor 310 of the operating environment 300 executes in the protected mode at the most privileged processor ring (e.g. 0P) to manage security and privilege barriers between the virtual machines 320, 330. Further, the monitor 310 may comprise code that implements the functionality of the virtual token 160. Alternatively, the virtual token 160 may be implemented with a separate VT software module.

The standard VM 320 may comprise an operating system 322 that executes at the most privileged processor ring of the VMX mode (e.g. 0D), and one or more applications 324 that execute at a lower privileged processor ring of the VMX mode (e.g. 3D). Since the processor ring in which the monitor 310 executes is more privileged than the processor ring in which the operating system 322 executes, the operating system 322 does not have unfettered control of the computing device 100 but instead is subject to the control and restraints of the monitor 310. In particular, the monitor 310 may prevent the operating system 322 and its applications 324 from accessing protected memory 132 and the physical token 150.

The monitor 310 may perform one or more measurements of the trusted kernel 332 such as a hash of the kernel code to obtain one or more integrity metrics, may cause the physical token 150 to extend an identified PCR register 244 with the integrity metrics of the kernel 332, and may record the integrity metrics in an associated PCR log stored in protected memory 132. The monitor 310 may then determine whether or not it trusts the kernel 332 based upon the integrity metrics of the kernel 332. In response to determining that the kernel 332 is trustworthy, the monitor 310 may establish the trusted VM 330 in protected memory 132 and launch the trusted kernel 332 in the established trusted VM 330.

Similarly, the trusted kernel 332 may take one or more measurements of an applet or application 334 such as a hash of the applet code to obtain one or more integrity metrics. The trusted kernel 332 via the monitor 310 may then cause the physical token 150 to extend an identified PCR register 244 with the integrity metrics of the applet 334. The trusted kernel 332 may further record the integrity metrics in an associated PCR log stored in protected memory 132. The trusted kernel 332 may determine whether or not it trusts the applet 334 based upon the integrity metrics of the applet 334. In response to determining that the applet 334 is trustworthy, the trusted kernel 332 may launch the trusted applet 334 in the established trusted VM 330 of the protected memory 132.

In response to initiating the trusted operating environment 300 of FIG. 3, the computing device 100 also records integrity metrics for the monitor 310 and the virtual token 160 in the monitor PCR register 240 and also records integrity metrics for the hardware in the trusted support (TS) PCR register 242. The trusted operating environment 300 may be initiated in response to various events such as, for example, system startup, an application request, an operating system request.

In an example embodiment, the computing device 100 obtains and records integrity metrics for the monitor 310 and the virtual token 160 as follows. The processor 110 hashes a monitor software module to obtain a monitor integrity metric. The processor 110 then causes the physical token 150 to extend the monitor PCR register 240 with the monitor integrity metric, and records the monitor integrity metric in a monitor PCR log stored in protected memory 132. Further, if the virtual token (VT) functionality is implemented as a separate software module, the processor 110 hashes the VT software module to obtain a VT integrity metric. The processor 110 then causes the physical token 150 to further extend the monitor PCR register 240 with the VT integrity metric and records the VT integrity metric in the monitor PCR log. The monitor PCR register 240 now comprises a value that is representative of both the monitor 310 and the virtual token 160.

The computing device 100 may further record integrity metrics for the hardware in TS PCR register 242 to provide a record of the hardware support for trusted operating environments. In an example embodiment, the processor 110 may obtain hardware identifiers such as, for example, processor family, processor version, processor microcode version, chipset version, and physical token version of the processors 110, chipset 120, and physical token 150. The processor 110 may then extend the TS PCR register 242 with obtained hardware identifiers and record the hardware identifiers in a TS PCR log stored in protected memory 132.

Besides recording integrity metrics in the physical token 150, the computing device 100 may report the recorded integrity metrics to a remote agent 190 or certification authority 195 to enable the remote agent 190 and certification authority 195 to make trust determinations based upon the reported integrity metrics. For example, the computing device 100 may provide a certification authority 195 with integrity metrics in order to have the certification authority 195 issue the computing device 100 an identity credential that attests to the public key of the identity credential being bound to the entity (e.g. the computing device 100) identified by identity credential. The computing device 100 may provide remote agents 190 with the issued identity credential in order to obtain secrets from the remote agent 190. The remote agent 190 may then determine whether to release secrets to the entity identified by the identity credential. If the remote agent 190 determines to release the secrets to the entity identified by the identity credential, the remote agent 190 may encrypt the requested secrets with the public key of the identity credential, and provide the requesting entity with the encrypted secrets.

In an example embodiment, a certification authority 195 may issue a physical token (PT) identity credential to a supplemental public key 232 of the computing device 100. In issuing the PT identity credential, the certification authority 195 basically attests that the supplemental public key 232 of the PT identity credential belongs to the physical token 150 identified by the PT identity credential. The PT identity credential may comprise an identity label for the PT identity credential, the supplemental public key 232 that is bound to this PT identity credential, a reference to a PT endorsement credential, a reference to a platform credential, a reference to a conformance credential, and a version identifier for the physical token 150 that are encrypted by a private key CAPriv of the issuing certification authority 195.

The PT endorsement credential, the platform credential, and the conformance credential referenced by the PT identity credential are credentials that certificate authorities 195 issue to attest to integrity aspects of the computing device 100 and to provide information in support of the attestation. In particular, the PT endorsement credential attests that the fixed public key 232 of the PT endorsement credential was generated by the identified physical token 150 and that the identified physical token 150 satisfies criteria defined for suitable physical tokens 150. Similarly, the platform credential basically attests that the referenced PT endorsement credential is bound to a platform or computing device 100 having a design and construction that satisfies criteria defined for suitable platforms. Further, the conformance credential attests that the referenced PT endorsement credential is bound to a platform or computing device 100 having an overall design that conforms to criteria defined for suitable platforms.

The PT identity credential, the PT endorsement credential, the platform credential, and the conformance credential may be implemented and may be issued in a number of different manners. However, in an example embodiment, the PT identity credential, the PT endorsement credential, the platform credential, and the conformance credential are implemented and issued in a manner that respectively complies with the Identity Credential, the TPM Endorsement Credential, the Platform Credential, and the Conformance Credential described in detail in the TCPA Main Specification, Version 1.1, 31 Jul. 2001.

Figure 4:
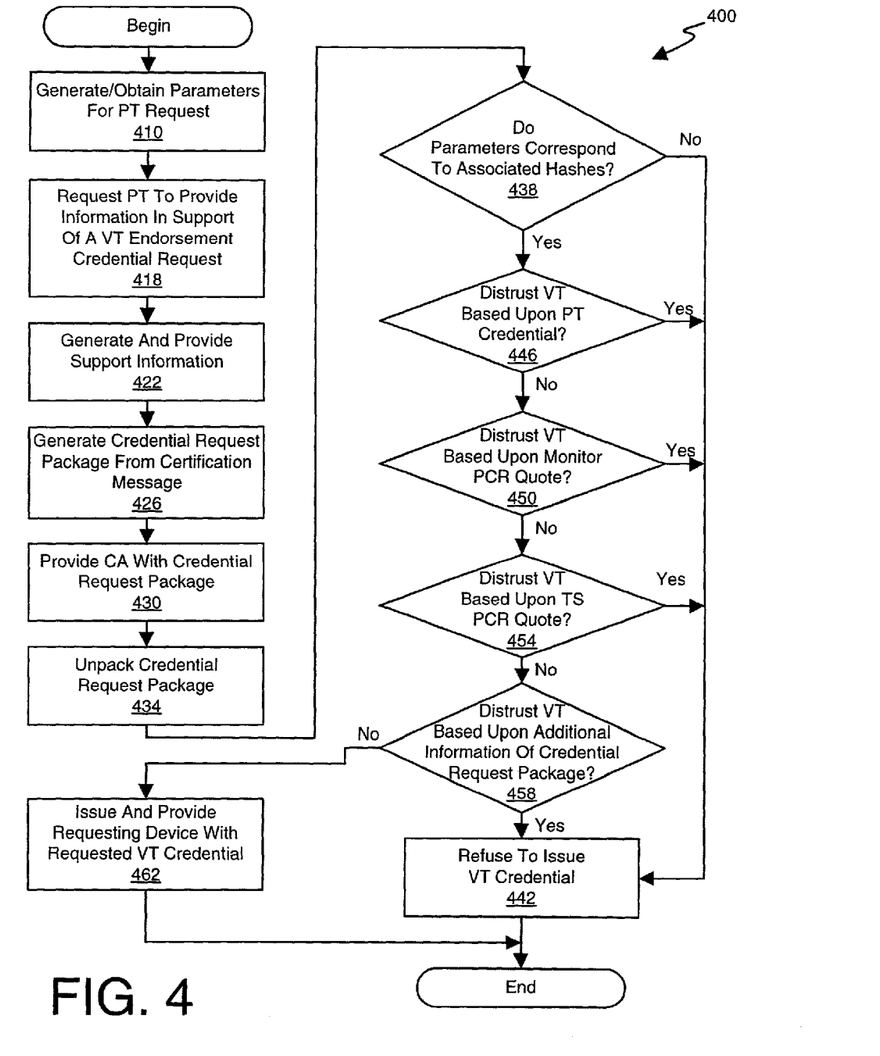
FIG. 4 illustrates an example method of obtaining a credential for the virtual token of FIG. 1.

Referring now to FIG. 4, there is depicted a method 400 of obtaining a VT endorsement credential from a selected certification authority 195. The computing device 100 may execute the method 400 in response to various events such as, for example, the monitor 310, the standard VM 320, the trusted VM 330, a remote agent 190, and/or a certification authority 195 requesting that the computing device 100 establish a virtual token 160 and a corresponding VT endorsement credential. In issuing the VT endorsement credential, the selected certification authority 195 attests that fixed public key 262 of the VT endorsement credential is bound to the virtual token 160, the virtual token 160 is bound to and uniquely identifies the computing device 100, and the virtual token 160 satisfies criteria defined for suitable virtual tokens.

The computing device 100 and the selected certification authority 195 may perform all or a subset of the method 400 in response to executing instructions of a machine readable medium such as, for example, read only memory (ROM); random access memory (RAM); magnetic disk storage media; optical storage media; flash memory devices; and/or electrical, optical, acoustical or other form of propagated signals such as, for example, carrier waves, infrared signals, digital signals, analog signals. Furthermore, while the method 400 illustrates operation of the computing device 100 and the selected certification authority 195 as a sequence of operations, the computing device 100 and the selected certification authority 195 may perform various operations in parallel or in a different order.

In block 410, the monitor 310 generates and/or obtains parameters that are provided to the physical token 150 in response to requesting the physical token 150 to attest to the identity of the monitor 310, to tie the received parameters to the request, and to attest to the current hardware and/or software environment of the computing device 100. The monitor 310 in block 418 may make such a request of the physical token 150 by executing a request function such as, for example, a TPM_VirtualTPMCredential function. The format of the example TPM_VirtualTPMCredential function is shown below:

TPM_VirtualTPMCredential (SigH, MQuote,
  CertM1, H2, AllPCRQuote)

where the signed hash SigH is an input parameter and the parameters MQuote, CertM1, H2, and AllPCRQuote are output parameters provided by the physical token 150.

The signed hash SigH provides the physical token 150 with a value that identifies the VT public key 262, a PT identity credential PTIdCred of the physical token 150, and a public key CAPub of the selected certification authority 195. For example, the monitor 310 may generate a data set that includes the VT public key 262, the PT identity credential PTIdCred, and the public key CAPub and may encrypt the data set with the VT private key 260 to obtain the signed data set SigDS. The monitor 310 may then hash the signed data set SigDS via the SHA-1 hash algorithm or some other algorithm to obtain the signed hash SigH that attests to, fingerprints, or identifies the VT public key 262, the PT identity credential PTIdCred, and the public key CAPub.

In response to the request, the physical token 150 in block 422 provides the monitor 310 with information that attests to the identity of the monitor 310, the VT public key 262, and PT identity credential PTIdCred and that attests to the current hardware and/or software environment of the computing device 100. For example, in response to the example TPM_VirtualTPMCredential provides the monitor 310 with a certification message CertM1, a signed index MQuote, quotes AllPCRQuote of all PT PCR registers 240, 242, 244, and a hash H2 that provides uniqueness and attests to other parameters. The physical token 150 may generate the signed index MQuote by encrypting the index MPCR that identifies the monitor PCR register 240 of the physical token 150 with the supplemental private key 230 associated with the PT identity credential PTIdCred.

In an example embodiment, the physical token 150 generates the certification message CertM1 based upon the following message format:

Cert$M1$=(Format1, $H1$, $H2$) $CA$Pub which indicates the certification message CertM1 comprises a hash H1 and the hash H2 encrypted by the public key CAPub. The format parameter Format1 may comprise a predefined ASCII string such as "PT_CertM1" that identifies the message as a certification message CertM1 created by the physical token 150. The public key CAPub corresponds to the public key of the selected certification authority 195 which may have been provide by the request of the monitor 310 or previously provided to the physical token 150.

The hash H1 identifies the VT public key 262, the PT identity credential PTIdCred, and the public key CAPub and provides uniqueness to help prevent replay attacks. In an example embodiment, the physical token 150 generates a nonce Nonce1 such as a 160 bit random value generated by a random number generator of its processing unit 210. The physical token 150 may then generate the hash H1 by hashing the signed hash SigH received from the monitor 310 and the generated nonce Nonce1 according to a hashing algorithm such as the SHA-1 hashing algorithm.

The hash H2 attests to the hash H1, the index MPCR, the signed index MPCR, and provides uniqueness. In an example embodiment, the physical token 150 may generate the hash H2 by hashing the hash H1, the index MPCR, and the signed index MQuote, thus tying the hash H1 to the index MPCR and the signed index MQuote. Further, since the hash H2 includes the hash H1, the hash H2 further attests to the VT public key 262, the PT identity credential PTIdCred, and the public key CAPub, thus further tying these parameters to the index MPCR and the signed index MPCR. Further, the hash H2 comprises uniqueness through the nonce Nonce1 of the hash H1.

The monitor 310 in block 426 may generate a credential request package CredP1 that provides the certification authority 195 with information from which it may decide to issue a VT endorsement credential. In an example embodiment, the physical token 150 generates the credential request package CredP1 based upon the following package format:

Cred$P1$=($EDS1$, Cred$M1$·$CA$Pub)

which indicates the credential request package CredP1 comprises a credential request message CredM1 encrypted with the public key CAPub of the selected certification authority 195 and an encrypted data set EDS1 that is not encrypted with the public key CAPub.

The encrypted data set EDS1 provides information about the computing device 100. In an example embodiment, the monitor 310 generates a data set DS1 that includes the certification message CertM1, the VT public key 262, the PT identity credential PTIdCred, an index TSPCR that identifies the TS PCR register 242, the quotes AllPCRQuote of the PCR registers 240, 242, 244, and logs AllPCRLogs of the PCR registers 240, 242, 244. The monitor 310 further generates a session key S1 and encrypts the data set DS1 using the session key S1 and a symmetric encryption algorithm such as, for example, DES, 3DES, and/or AES.

The credential request message CredM1 attests to the information of the encrypted data set EDS1 and provides the session key S1 used to encrypt/decrypt the encrypted data set EDS1. In an example embodiment, the monitor 310 generates the credential request message CredM1 based upon the following message format:

CredM1=(Format2, H2, H3, S1)CAPub which indicates the credential request message CredM1 comprises a format parameter Format2, the hash H2 provided by the physical token 150, another hash H3, and the session key S1 encrypted with the public key CAPub of the selected certification authority 195.

The format parameter Format2 may comprise a predefined ASCII string such as "Mon_CredM1" that identifies the message as a credential request message created by the monitor 310. The hash H3 attests to the data of the data set DS1. The monitor 310 may generate the hash H3 by hashing the parameters of the data set DS1 using a hashing algorithm or some other algorithm. In an example embodiment, the monitor 310 hashes the certification message CertM1, the VT public key 262, the PT identity credential PTIdCred, the index TSPCR, the quotes AllPCRQuote, and the logs AllPCRLogs using the SHA-1 hashing algorithm.

In block 430, the monitor 310 may request the selected certification authority 195 to issue a VT endorsement credential to the virtual token 160 and may transfer the credential request package CredP1 to the selected certification authority 195 in support of the request. In an example embodiment, the monitor 310 transfers the credential request package CredP1 to the certification authority 195 as part of a transaction that may provide further information about the request such as encryption algorithms used, hashing algorithm used, credential request package format used, etc.

The certification authority 195 in block 434 may unpack the credential request package CredP1 to obtain information provided by the credential request package CredP1. For example, the certification authority 195 may decrypt the credential request package CredP1 using its corresponding private key CAPriv to obtain the session key S1 and the other information of the credential request package CredP1. The certification authority 195 may further decrypt the encrypted data set EDS1 using the session key S1 of the certification message CertM1 to obtain the data of the data set DS1. The certification authority 195 may further decrypt the certification message CertM1 and the credential request message CredM1 using its private key CAPriv.

In block 438, the certification authority 195 may validate the information provided by the credential request package CredP1. For example, the certification authority 195 may re-calculate hashes H1, H2, H3 from parameters provided by the data set DS1 to obtain computed hashes CH1, CH2, CH3. The certification authority 195 may then determine that the data of the data set DS1 are the same parameters that the hashes H1, H2, H3 attested in response to the computed hashes CH1, CH2, CH3 having a predetermined relationship (e.g. equal) with the provided hashes H1, H2, H3.

In response to determining that the information provided by the credential request package CredP1 do not correspond to the hashes H1, H2, H3 of the credential request package CredP1, the certification authority 195 in block 442 may refuse to issue the requested VT endorsement credential. The certification authority 195 may further provide the computing device 100 with an indication as to why the request for the VT endorsement credential VTCred was refused. In an example embodiment, the certification authority 195 does not provide any indication as to why the request was refused to prevent supplying information that may be used to circumvent the certification process.

In response to determining that the information provided by the credential request package CredP1 corresponds to the hashes H1, H2, H3 of the credential request package CredP1, the certification authority 195 in block 446 may determine whether it distrusts the physical token 150 based upon the PT identity credential parameter PTIdCred. The certification authority 195 may determine that the virtual token 160 is not trustworthy because the identified version of the physical token 150 has known vulnerabilities, the PT identity credential has expired, and/or the entity identified by the PT identity credential is untrustworthy. The certification authority 195 may further determine that the virtual token 160 is not trustworthy because the certification authority 195 that issued the PT identity credential is untrustworthy, the referenced platform conformance credential is untrustworthy, and/or the referenced conformance credential is untrustworthy.

In response to distrusting the virtual token 160 based upon the PT identity credential parameter PTIdCred, the certification authority 195 in block 442 may refuse to issue the requested VT endorsement credential. Otherwise, the certification authority 195 in block 450 may determine based upon the quote of the monitor PCR register 240 and its corresponding PCR log whether the certification authority 195 distrusts the virtual token 160 of the computing device 100. As indicated above, the monitor PCR register 240 records integrity metrics of the monitor 310 and the virtual token 160. Further, the monitor PCR log comprises the integrity metrics recorded by the monitor PCR register 240. Accordingly, the certification authority 195 may obtain the quote and log of the monitor PCR register 240 from the quote AllPCRQuote and logs AllPCRLog based upon the index MPCR of the credential request package CredP1. The certification authority 195 may then determine whether the quote and log of the monitor PCR register 240 are indicative of a trusted implementation of the monitor 310.

In response to distrusting the virtual token 160 based upon the quote and/or log of the monitor PCR register 240, the certification authority 195 in block 442 may refuse to issue the requested VT endorsement credential. Otherwise, the TD certification authority 195 in block 454 may determine based upon the quote of the TS PCR register 242 and its corresponding PCR log whether the certification authority 195 distrusts the virtual token 160 of the computing device 100. As indicated above, the TS PCR register 242 records integrity metrics for the hardware components of the computing device 100 from which trusted environment support capabilities may be determined. Further, the TS PCR log comprises the integrity metrics recorded by the TS PCR register

242. Accordingly, the certification authority 195 may obtain the quote and log of the TS PCR register 242 from the quotes AllPCRQuote and the logs AllPCRLog based upon the index TSPCR of the credential request package CredP1. The certification authority 195 may then determine whether the quote and log of the TS PCR register 242 are indicative of trusted hardware components.

In response to distrusting the virtual token 160 based upon the quote and/or log of the TS PCR register 242, the certification authority 195 in block 442 may refuse to issue the requested VT endorsement credential. Otherwise, the certification authority 195 in block 458 may determine based upon additional information of the credential request package CredP1 whether to distrust the virtual token 160 of the computing device 100. For example, the certification authority 195 may determine to distrust the virtual token 160 based upon the quotes and/or logs of the other PCR registers 244 provided by the quotes AllPCRQuote and the logs AllPCR-Log of the credential request package CredP1.

In response to distrusting the virtual token 160 based upon the additional information, the certification authority 195 in block 442 may refuse to issue a VT endorsement credential. Otherwise, the certification authority 195 in block 462 may provide the monitor 310 with the requested VT endorsement credential. To this end, the certification authority 195 may generate the VT endorsement credential to include a label identifying the credential as a VT endorsement credential, the fixed public key 262 of the virtual token 160, a reference to the certification authority 195, and possibly other information about the computing device 100, the physical token 150, and/or virtual token 160. The certification authority 195 may then digitally sign the VT endorsement credential with its private key CAPub and further encrypt the signed endorsement credential with the public key 262 of the virtual token 160.

The computing device 100 may later provide a remote agent 190 with the obtained VT endorsement credential to attest that the fixed public key 262 of the VT endorsement credential is bound to the computing device 100. Furthermore, the computing device 100 may utilize the VT endorsement credential to obtain VT identity credentials from a selected certification authority 195 that attest to a supplemental public key 272 being bound to the computing device 100. The certification authority 195 may issue the VT identity credentials in a manner similar to the PT identity credentials described above.

It should be appreciated that the above method 400 is merely an example method. For example, the method 400 utilizes techniques to overcome size limits of typical asymmetric cryptographic algorithms. Asymmetric cryptographic algorithms generally only successfully encrypt data or data sets having a size that is less than or equal to a maximum size defined by a modulus of the asymmetric cryptographic algorithm. One way to overcome the size limit of an asymmetric cryptographic algorithm is to generate a session key for a symmetric algorithm, encrypt the data set using the session key and the symmetric algorithm, and encrypt the session key using the an asymmetric key and an asymmetric encryption algorithm. The data set may be later decrypted by the session key which is retrieved using the corresponding asymmetric key and asymmetric algorithm. Thus, in effect encrypting the data set via the asymmetric key and asymmetrically encryption algorithm.

Another way to overcome the size limit of an asymmetric cryptographic algorithm is to generate one or more hashes that attest to the data contained in a data set and asymmetrically encrypt the one or more generated hashes. An entity (e.g. the certification authority 195) may asymmetrically decrypt the hashes, calculate computed hashes from a received data set, and determine that the received data set is the same data set attested to by the decrypted hashes in response to the computed hashes having a predetermined relationship (e.g. equal) with the decrypted hashes.

Yet another way to overcome the size limit is to split the data set into data subsets that are less than the maximum size of an asymmetric cryptographic algorithm. The data subsets may then be individually encrypted using an asymmetric key and the asymmetric algorithm. An entity (e.g. the certification authority 195) may later asymmetrically decrypt each of the subsets using the corresponding asymmetric key and reconstruct the data set from the data subsets.

It should be appreciated that depending upon the size of the data sets and size limits of the encryption algorithms used, the method 400 may be implemented to use zero or more of the above techniques. Furthermore, it should be appreciated that the method 400 as described also uses hashes (e.g. H1, H2, H3) that are compact representations (e.g. 160 bit) of larger data sets (160 kilobytes) to reduce traffic between components (e.g. monitor and physical token 150) and/or entities (computing device 100 and certification authority 195). However, it should be appreciated that, in general, generation and/or transfer of the hashes may be replaced with transfers of the data sets represented by the hashes.

For example, the monitor 310 may provide the physical token 150 with one or more portions of the data set (e.g. the VT public key 262, the PT identity credential PTIdCred, and/or the public key CAPub) represented by the signed hash SigH. Thus, the generation and transfer of the signed hash SigH or the inclusion of those portions of the data set in the signed hash SigH may be eliminated. The physical token 150 may then attest to the received portions of the data set via the hashes H1, H2 of the certification message CertM1 as described above. Alternatively, the physical token 150 may attest to the received portions of the data set by including one or more of them in the certification message CertM1. Thus, the hashes H1, H2 of the certification message CertM1 may be eliminated or may be generated without including portions of the data set that are attested to by mere inclusion in the certification message CertM1. It should be appreciated that if the certification message CertM1 comprises data instead of a hash of the data, such data may be eliminated from the data set DS1 since certification authority 195 may obtain the data from the certification message CertM1.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
receiving a certification message generated by a physical token of a computing device that attests to a public key associated with a virtual token of the computing device and the physical token; and
requesting an entity to issue a credential for the public key associated with the virtual token based upon the certification message.

2. The method of claim 1 wherein receiving comprises
receiving the certification message that is encrypted by a public key of the entity and that comprises a hash of both the public key associated with the virtual token and a credential issued to the physical token.

3. The method of claim 2 wherein requesting comprises
sending to the entity the certification message, the public key associated with the virtual token, and the credential issued to the physical token.

4. The method of claim 3 wherein requesting further comprises
sending to the entity one or more integrity metric quotes from the physical token and one or more logs associated with the integrity metric quotes.

5. The method of claim 1 further comprising
encrypting one or more integrity metric quotes with a session key of a symmetric cryptographic algorithm to obtain a first encrypted parameter;
encrypting the certification message and session key with a public key associated with the entity to obtain a second encrypted parameter;
wherein requesting comprises sending to the entity the first encrypted parameter and the second encrypted parameter.

6. The method of claim 1 wherein receiving comprises
receiving the certification message encrypted by the public key of the entity, the certification message comprising a hash that attests to the public key associated with the virtual token and a credential issued to the physical token.

7. The method of claim 1 wherein receiving comprises
receiving the certification message encrypted by the public key of the entity, the certification message comprising the public key associated with the virtual token and a credential issued to the physical token.

8. A physical token for a computing device, comprising
a register to record an integrity metric that measures a virtual token of the computing device, and
one or more processing units to generate a random number and a certification message that specifies the register, that is encrypted by a key of an entity, and that has uniqueness based upon the random number.

9. The physical token of claim 8 wherein
the one or more processing units generates the certification message such that the certification message further comprises a hash that identifies a key associated with the virtual token and a credential issued to the physical token.

10. The physical token of claim 8 wherein
the one or more processing units generates the certification message such that the certification message further identifies a key associated with the virtual token and a credential issued to the physical token.

11. The physical token of claim 8 wherein
the integrity metric comprises a hash of a virtual machine monitor that comprises the virtual token.

12. The physical token of claim 8 wherein
the certification message comprises one or more hashes that attest to a key associated with the virtual token, the credential issued to the physical token, and an index specifying the register.

13. A computing device comprising
a virtual token to record integrity metrics;
a physical token to record an integrity metric that measures the virtual token, and to generate a certification message that attests to the integrity metric, that is encrypted by an asymmetric key of an entity, and that has uniqueness; and
a processor to request the entity to issue a credential for an asymmetric key associated with the virtual token based upon the certification message.

14. The computing device of claim 13 wherein
the physical token generates the certification message such that the certification message that identifies the asymmetric key associated with the virtual token and a credential issued to the physical token, and
the processor sends the entity the certification message, the asymmetric key associated with the virtual token, and the credential issued to the physical token.

15. The computing device of claim 14 wherein
the processor further sends one or more integrity metric quotes from the physical token and one or more logs associated with the integrity metric quotes.

16. The computing device of claim 13 wherein the processor
sends the entity a symmetric key that is encrypted with the asymmetric key of the entity, and
sends the entity the certification message, the asymmetric key associated with the virtual token, and the credential issued to the physical token that are encrypted with the symmetric key.

17. A computing device comprising
a physical token to generate a certification message that attests to an operating environment of the computing device and a credential issued to the physical token; and
a virtual machine monitor comprising a virtual token to further attest to the operating environment, wherein the virtual machine monitor requests the physical token to provide the certification message, causes the certification message to be transferred to an entity, and receives a credential for the virtual token in response to transferring the certification message to the entity.

18. The computing device of claim 17 wherein
the physical token generates the certification message such that the certification message further comprises one or more hashes that identify a public key associated with the virtual token and the credential issued to the physical token.

19. The computing device of claim 17 wherein
the physical token generates the certification message such that the certification message further comprises a public key associated with the virtual token and the credential issued to the physical token.

20. The computing device of claim 17 wherein
the physical token generates the certification message to include an integrity metric representative of the virtual machine monitor.

21. The computing device of claim 17 wherein
the physical token and virtual token attest to the operating environment by providing quotes of recorded integrity metrics, and
the virtual machine monitor further provides the entity with one or more quotes of recorded integrity metrics.

22. A method comprising
receiving a request for a credential to be issued to a virtual token of a computing device;
determining whether the virtual token satisfies criteria for a suitable virtual token based upon information of the request; and issuing the credential to the virtual token of the computing device in response to determining that the virtual token satisfies the criteria.

23. The method of claim 22 wherein determining comprises analyzing a credential provided by the request that was issued to a physical token of the computing device.

24. The method of claim 23 wherein determining further comprises analyzing an integrity metric representative of the virtual token of the computing device.

25. The method of claim 24 wherein determining further comprises analyzing an integrity metric that is based upon a hash of a monitor that comprises the virtual token.

26. A machine readable medium comprising instructions, which in response to being executed, result in a computing device generating a certification message that attests to a physical token and an operating environment of a computing device; and requesting that an entity issue a credential to a virtual token of the computing device based upon the certification message.

27. The machine readable medium of claim 26 wherein the instructions, in response to being executed, further result in the computing device generating the certification message such that the certification message comprises a hash that attests to a public key associated with the virtual token.

28. The machine readable medium of claim 27 wherein the instructions, in response to being executed, further result in the computing device generating the certification message such that the certification message is encrypted by a public key of the entity and the hash further attests to a credential issued to the physical token.

29. The machine readable medium of claim 28 wherein the instructions, in response to being executed, further result in the computing device sending the public key associated with the virtual token and the credential associated with the physical token.

30. The machine readable medium of claim 26 wherein the instructions, in response to being executed, further result in the computing device generating the certification message such that the certification message is encrypted with a public key of the entity and comprises one or more hashes that attest to a public key associated with the virtual token and the credential associated with the physical token;

encrypting the public key associated with the virtual token, the credential associated with the physical tokens, the certification message, quotes of integrity metrics recorded by the physical token, and logs associated with the integrity metrics with a session key to obtain a first parameter; and encrypting the session key with the public key of the entity to obtain a second parameter, wherein requesting comprises sending the entity the first parameter and the second parameter.

* * * * *